Sept. 11, 1945. O. E. DIETRICH 2,384,780
REVERSIBLE PITCH PROPELLER
Filed April 17, 1942 4 Sheets-Sheet 1
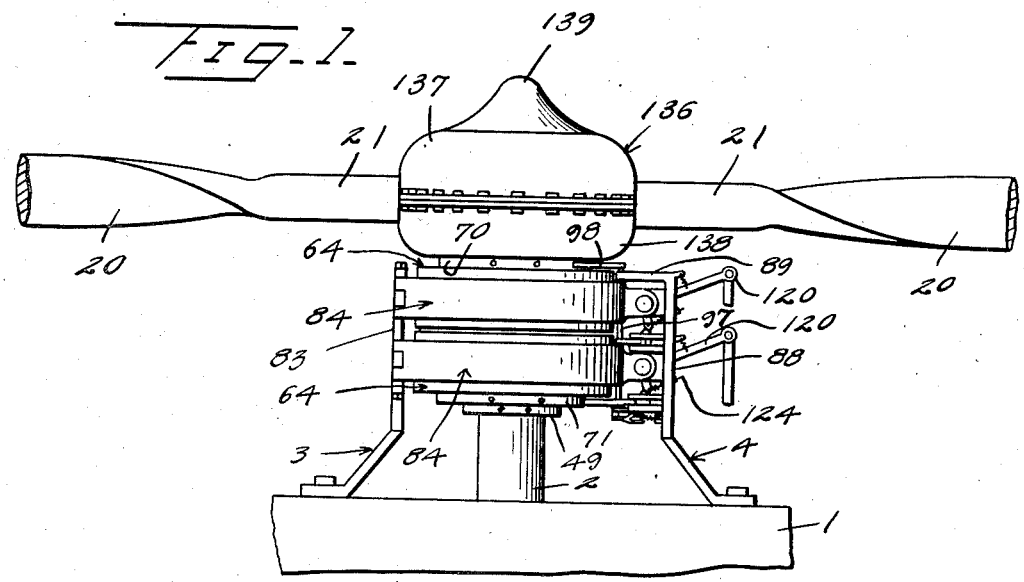
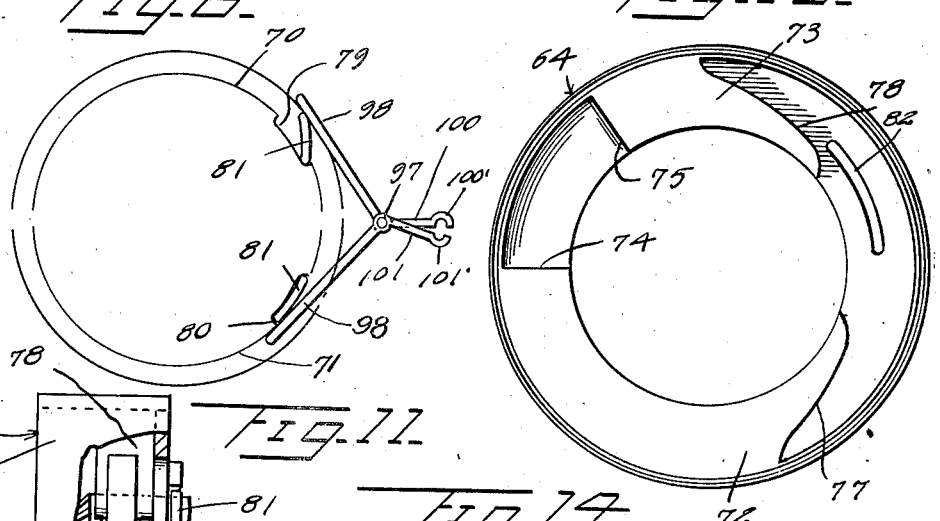
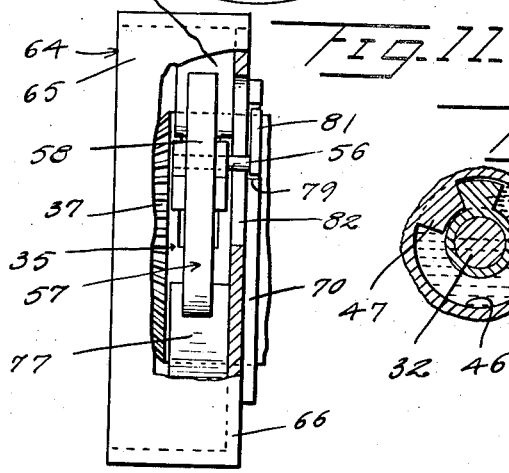
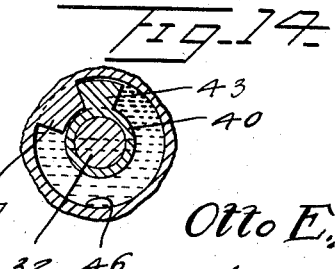
Inventor
Otto E. Dietrich
By Watson E. Coleman
Attorney Sept. 11, 1945.   O. E. DIETRICH   2,384,780
REVERSIBLE PITCH PROPELLER
Filed April 17, 1942   4 Sheets-Sheet 2
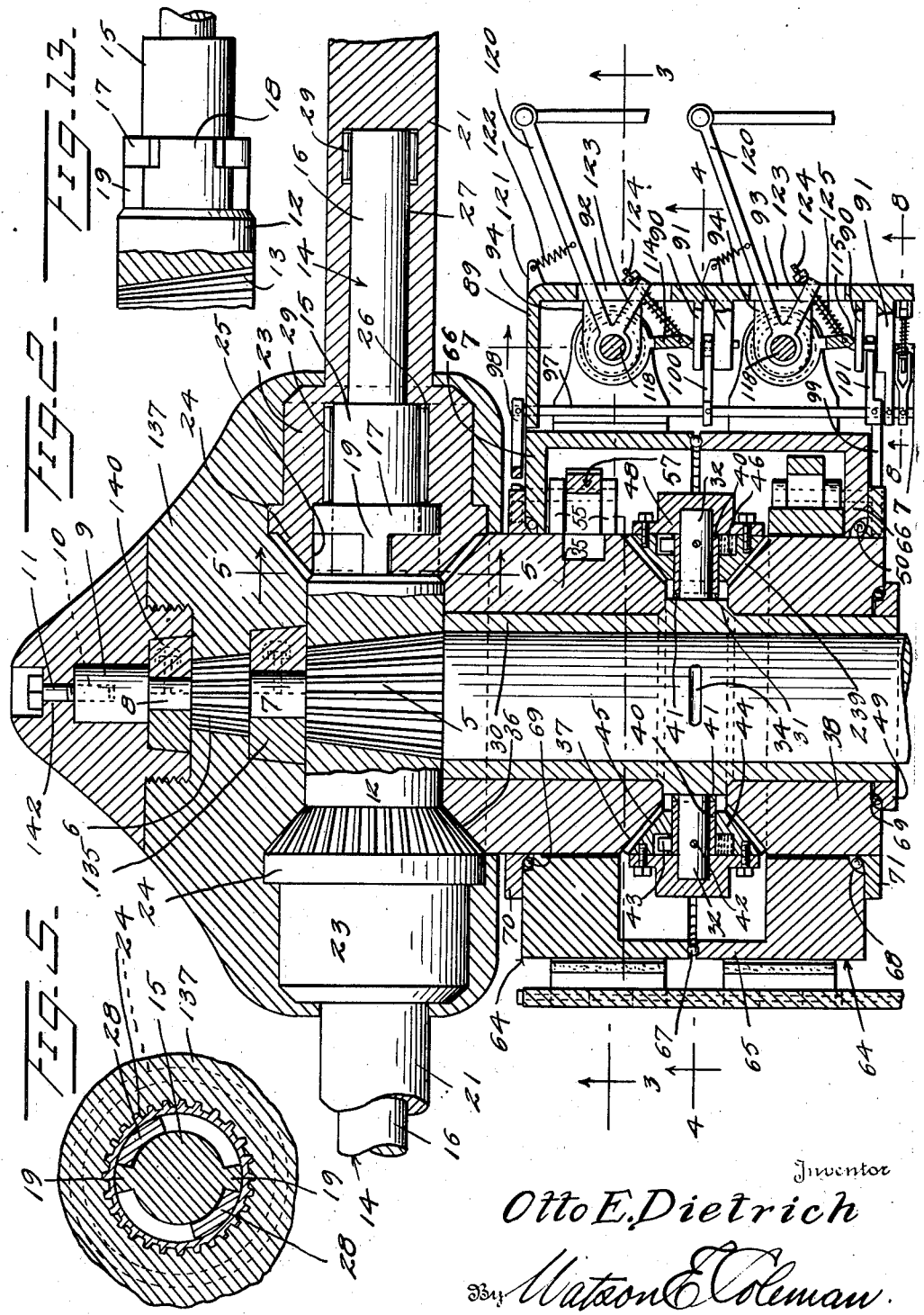
Inventor
Otto E. Dietrich
By Watson E. Coleman.
Attorney Sept. 11, 1945.   O. E. DIETRICH   2,384,780
REVERSIBLE PITCH PROPELLER
Filed April 17, 1942   4 Sheets-Sheet 3
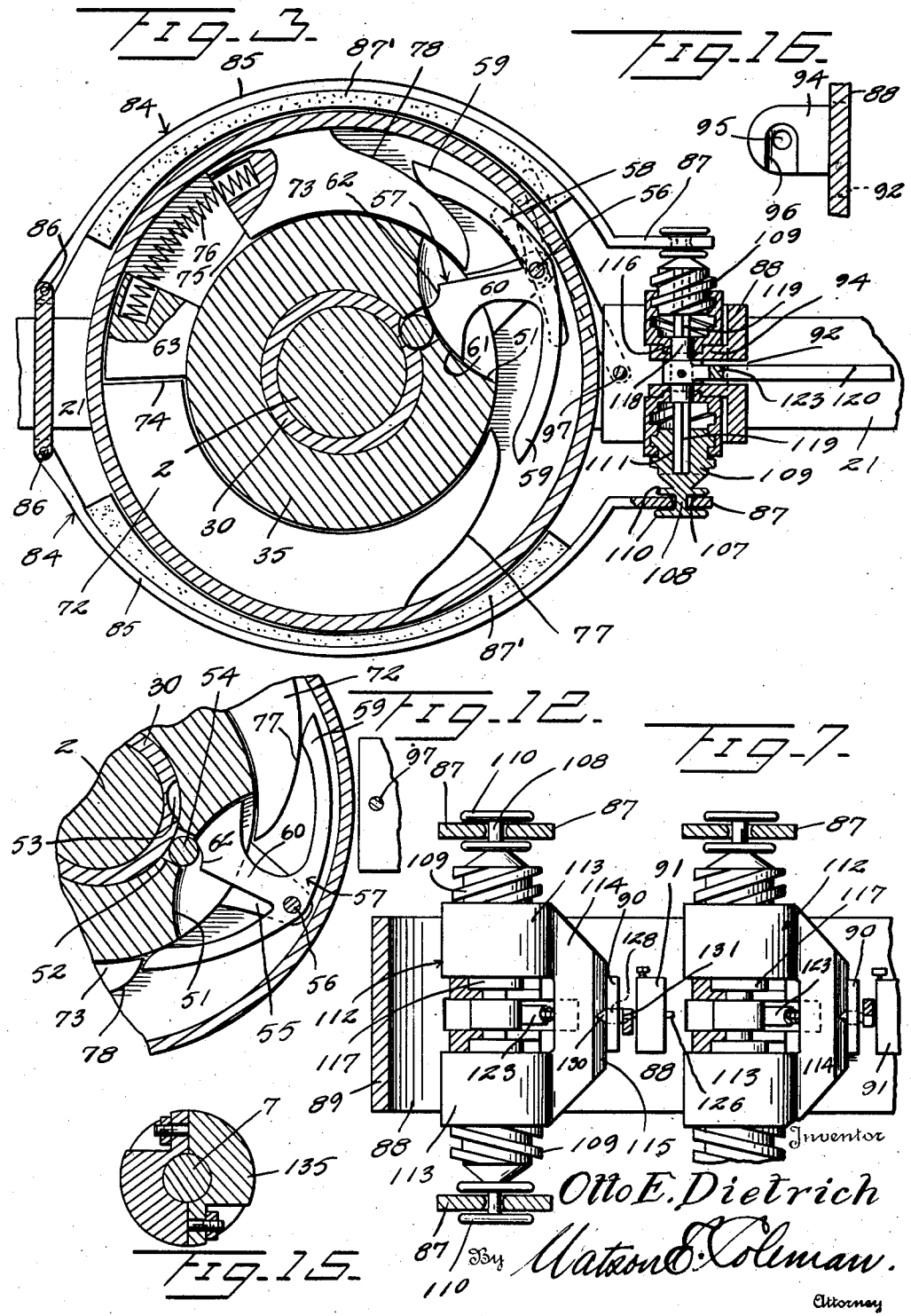

Sept. 11, 1945.  O. E. DIETRICH  2,384,780
REVERSIBLE PITCH PROPELLER
Filed April 17, 1942  4 Sheets-Sheet 4
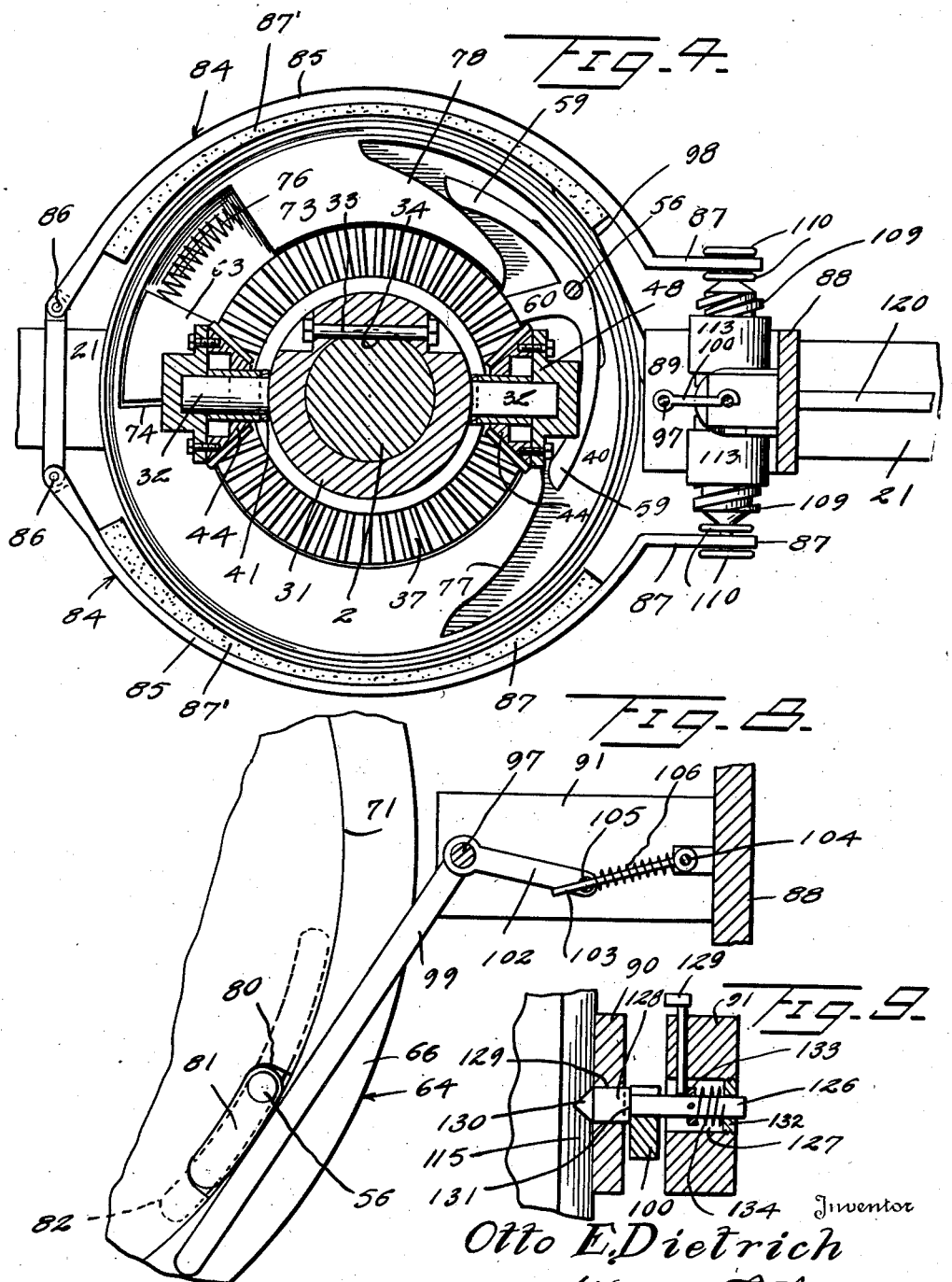
Inventor
Otto E. Dietrich
By Watson E. Coleman.
Attorney Patented Sept. 11, 1945

2,384,780

UNITED STATES PATENT OFFICE 2,384,780

REVERSIBLE PITCH PROPELLER

Otto Ernest Dietrich, Morton, Ill.

Application April 17, 1942, Serial No. 439,416

9 Claims. (Cl. 170—163)

This invention relates generally to the class of propellers and pertains particularly to improvements in reversible pitch propellers.

The primary object of the present invention is to provide a reversible pitch propeller designed for use in aircraft propulsion or in the propulsion of marine vessels, in which a novel control mechanism is provided for effecting positive rapid reversing of the positions of the propeller blades whereby the propeller may be employed as a brake, if used on an airplane or other aircraft, or to reverse the direction of movement of a marine craft when used in connection with such a vessel.

Another object of the invention is to provide a novel reversible pitch propeller mechanism in which the construction is such that the desired reversing of the propeller blades may be accomplished rapidly and at the same time without creating shock to the mechanism.

Still another object of the invention is to provide a reversible pitch propeller mechanism in which the construction is such that the desired reversing action is to a great extent automatic following the initiation of the movement of the parts of the mechanism through the actuation on the part of the operator of the craft upon which the device is mounted, of a single control element.

Other objects and advantages of the present invention will become apparent as the description of the same proceeds and the invention will be best understood from a consideration of the following detailed description taken in connection with the accompanying drawings it being understood, however, that the invention is not to be considered as limited by the specific illustration or description but that such illustration and description constitute a preferred embodiment of the invention.

In the drawings:

Figure 1 is a view in top plan of the reversible pitch propeller structure designed for use upon an aircraft and constructed in accordance with the present invention.

Figure 2 is a horizontal sectional view taken axially of the propeller shaft and through the mechanism embodying the present invention.

Figure 3 is a sectional view taken in a plane extending transversely of the propeller shaft substantially upon the line 3—3 of Figure 2.

Figure 4 is a sectional view on the line 4—4 of Figure 2 taken in a plane perpendicular to the propeller shaft.

Figure 5 is a detail section taken on the line 5—5 of Figure 2.

Figure 6 is a diagrammatic view illustrating the relation of the trip leaves to the trip leaf actuated arms and locking fingers.

Figure 7 is a detail sectional view taken on the line 7—7 of Figure 2.

Figure 8 is a fragmentary section taken substantially on the line 8—8 of Figure 2.

Figure 9 is a sectional view on an enlarged scale through a lock pin support showing the engagement of a lock finger and yoke with the pin.

Figure 10 is a view looking into the inner face of a break drum.

Figure 11 is a view in elevation of a break drum with a portion broken away to show the locking lever and associate parts housed in the drum.

Figure 12 is a fragmentary view illustrating the position of a locking lever and the associated locking key in unlocked position between the shaft sleeve and the adjacent drum gear.

Figure 13 is a view in elevation of a portion of the propeller hub showing the stops for limiting the movement of a propeller gear.

Figure 14 is a sectional view taken transversely of a shock absorber gear which is located between the two drum gears, the section being in a plane perpendicular to the rotary axis of the gear.

Figure 15 is a view illustrating a locking collar upon the forward end of the propeller shaft, the view being a section taken in a plane perpendicular to the axis of the shaft.

Figure 16 is a detailed illustration of one of a pair of cooperating ears supporting a yoke member.

While the present invention may be used both in air and water craft, as previously stated, for the operation of air screws or water propellers, for the sake of convenience the illustration and description of the invention will be confined to its use upon aircraft.

In accordance with the foregoing paragraph the numeral 1 in Figure 1 of the drawings designates a portion of an aircraft from which is shown projecting a power transmitting propeller shaft 2 and upon opposite sides of which are disposed frames or brackets 3 and 4, of suitable design or construction to support the hereinafter described portions of the mechanism.

Figure 2 illustrates the relative positions of the parts of the present mechanism and it will be seen upon reference to this figure that the propeller shaft 2 at its forward end is formed to provide the two axially extending and spaced conical sections 5 and 6 which are fluted or ribbed, as shown, for the purpose of keying thereto certain parts of the device. Between these conical portions is a reduced neck portion 7 and a corresponding but slightly smaller neck 8 extends axially from the outermost conical section 6 and forms an intermediate connection between this portion 6 and a terminal cylindrical portion 9. These portions or parts 5 to 9 inclusive are all an integral terminal extension of the shaft 2.

The outer or forward end of the terminal portion 9 has a tapped bore 10 which is threaded to receive a tap screw 11, employed as hereinafter described for maintaining a portion of the housing head for the mechanism in position.

The numeral 12 generally designates a propeller hub which is of circular cross-section and has a fluted tapered opening formed transversely therethrough, as indicated at 13, to receive the ribbed portion 5 of the propeller shaft. This hub has extending from each end an arm indicated generally by the numeral 14 which has a short inner end portion 15 and a longer outer end portion 16. The inner end portion 15 of the arm is of slightly greater diameter than the outer portion 16 and encircling the portion 15 adjacent to the end of the hub body is a two part collar 17, the ends of which are spaced to form at diametrically opposite positions the axially extending recesses 18. Each of the portions of the collar has extending from its inner side to the adjacent end of the hub at a position midway between the ends of the portion, the axially directed stop rib 19.

Each of the arms 14 has a propeller blade coupled therewith, such blade being shown in part in Figure 1 and indicated by the numeral 20. The shank of each propeller blade is indicated at 21 and, as best seen in Figure 2, is formed integrally with the hub portion 23 of a miter gear 24.

Each miter gear 24 has a socket 25 formed in the face thereof which socket leads into a circular chamber 26 and this in turn leads into a bore 27 formed axially in the shank 21 of the propeller blade. Oppositely positioned upon the face of the socket 25 are the two lugs 28, the circular area between which is of the proper proportion to snugly receive the inner end of the portion 15 of the hub arm while the length of the lug 28 is proportioned to position between the two part collar 17 and the adjacent end of the hub 12.

As will be readily seen upon reference to Figure 2, the socket 25 is designed to receive the lugs 28 and the collar 17, the lugs being introduced between the collar and the adjacent end of the hub through the spaces 18 and the portions 15 and 16 of the arm are received respectively in the chamber 26 and bore 27.

Suitable bearings 29 are interposed between the portions of the arm and the adjacent part of the gear hub and the propeller blade shank so that a smooth turning of the propeller blade on its supporting arm may be obtained.

It will be readily obvious that the stops 19 and lugs 28 cooperate to limit the rotary movement of the gear and the attached propeller blade and the arrangement of the parts is such that when the gear is turned to the limit of its movement in one direction the blade will be set so that the pitch thereof will be disposed to effect forward movement of the structure and when the gear is reversely turned to the limit of its movement the pitch of the blade will be completely reversed so as to effect reverse movement of the structure in the medium in which it is operating.

Disposed upon the propeller shaft 2 immediately behind the hub 12 and in abutting relation at one end with the hub is a sleeve 30 which, intermediate its ends, is provided with the external encircling collar 31 from which there extends at diametrically opposite points the trunnions 32. This sleeve is secured in a suitable manner to the shaft 2 so as to be held against axial and rotational movement thereon. The means here shown comprises a bolt 33, Figure 4, which is extended transversely through the sleeve at one side of the axial center so that a portion of the bolt will be exposed upon the interior of the sleeve and the shaft is provided with a suitable transverse recess or channel 34 in which this exposed portion of the bolt engages. The heads of the bolt are countersunk in the sleeve so as to be within the circular area defined by the overall circumference of the sleeve as shown.

Upon the forward side of the sleeve between the collar 31 and the hub 12 is the double miter gear 35, the toothed faces of which are indicated at 36 and 37. One of these toothed surfaces or faces here indicated by the numeral 36, is in toothed connection with the gears 24.

Upon the opposite side of the collar 31 the sleeve 30 carries the miter gear 38 which has a single gear face 39.

Enclosing the major portion of each trunnion 32 is a bearing sleeve 40 between the inner end of which and the adjacent collar 31 is a packing washer 41. This bearing sleeve 40 is pinned to the trunnion as indicated at 42 and carries a baffle member 43, as is best illustrated in Figure 14.

Rotatably supported upon each trunnion 32 and the bearing sleeve secured thereto, is an idler miter gear 44 which has its toothed face in operative connection with the adjacent faces 37 and 39 of the major gears 35 and 38. Each of these idler gears 44 has formed therein from the outer side a fluid chamber 46 in which the baffle 43 carried by the bearing sleeve, positions as is clearly shown in Figure 2.

The side wall of the fluid chamber 46 carries a dasher 47 which moves around the bearing sleeve 40 from one side of the baffle 43 to the other side upon rotation of the idler gear and thus when the chamber 46 is filled with a suitable fluid these coaction parts 43 and 47 function, in the nature of a dash pot, to absorb shock.

The chamber 46 is closed by a cap 48 which is secured to the outer side of the idler gear and has a central bearing socket for the outer end of the adjacent trunnion 32, as shown in Figure 2.

The gear 35 is maintained in position and against axial movement by the hub 12 and by the collar 31. The inner main gear 38 also abuts at one side against the collar 31 and it is held against movement away from this collar by the securing ring 49 which encircles and is secured to the inner or rear end of the sleeve 30. A suitable antifriction means in the form of bearing balls 50 is interposed between the retaining ring 49 and the adjacent gear 38.

Each of the main gears 35 and 38 has formed in the outer side thereof an arcuate recess 51, Figures 3 and 12, and leading from the bottom of each of these recesses is a channel 52 which opens at its inner end against the sleeve 30.

The sleeve 30 is provided with two notches 53 each of which is in a circumferential line to register with the adjacent channel 52 when the gear is turned to the proper extent.

Each of the channels 52 houses a locking key 54, the function of which will be hereinafter described.

Upon the outer side of each gear body there are located two radially extending axially spaced bearing posts 55 which are disposed upon opposite sides of the recess 51 and supported by and extending across between each pair of bearing posts is a locking lever supporting pintle 56.

Each pintle 56 supports a locking lever which is indicated as a whole by the numeral 57. Each locking lever comprises an elongated arcuate portion 58 which provides the two terminal fingers 59, which are directed toward but are spaced from the side of the adjacent gear.

At the point of connection of the arm 58 with the pintle 56 there is secured an inwardly extending leg 60 which projects into the adjacent arcuate recess 51 and which has an arcuate sole portion 61 which is located in close proximity to the arcuate bottom of the recess 51 which it follows upon oscillation of the pintle. This sole, at one end, is cut out or notched as indicated at 62 to permit the adjacent key 54 to come out of the channel 52 when the leg has been swung to one position at a period in the operation of the mechanism.

The pintle 56 supported upon the forward gear 35 extends forwardly from the locking lever while the pintle which is associated with the rear gear 38 extends rearwardly from the locking lever which it supports, as shown in Figure 2.

Each gear 35 and 38 carries a radially extending wing 63, as shown in Figures 3 and 4, for the purpose hereinafter described.

Encircling the gears 35 and 38 are brake drums 64 each of which has an encircling wall 65 and is closed at one end by the end wall 66. The open ends of these drums are in opposed relation, as shown in Figure 2, and the opposing edge faces of the encircling walls 65 are channeled or recessed to receive the antifriction balls 67. The drums thus form an annular chamber within which is enclosed the pair of idler gears 44 and the parts associated therewith.

The remote end wall 66 of the brake drums are provided with annular bearing ball raceways 68 for the reception of bearing balls 69 and the forward main gear 35 is encircled by and has secured thereto the retaining and bearing collar 70 which engages and cooperates with the adjacent bearing balls 69 while the gear 38 has a similar bearing and drum retaining collar 71 thereabout and secured thereto which maintains the adjacent drum in position and cooperates with the adjacent bearing balls 69 for the smooth rotation of the drum on the gear.

Within each brake drum 64 there are disposed against the end wall of the drum the two spaced arcuate shoulders 72 and 73. These shoulders have the two spaced straight end walls 74 and 75 between which the wing 63 of the adjacent gear is located and these walls are spaced apart a distance to allow for a predetermined amount of movement of the wing between and relative to the walls.

The wall 75 of the shoulder 73 is recessed to receive an end of an expansion spring 76 while the opposite end of this spring bears against or is located in a suitable recess in the wing so that the spring constantly tends to urge the turning of the adjacent drum in one direction about the gear.

The shoulders 72 and 73 are formed at their other ends to provide camming shoulders 77 and 78 respectively which have their working faces or surfaces directed radially of the drum toward the encircling drum wall 65 as is clearly shown in Figure 3. The adjacent ends of these camming faces have the bearing posts 55 and leg 60 located therebetween and the fingers 59 are designed to alternately ride onto the camming faces in the operation of the mechanism, in the manner hereinafter set forth.

Each of the collars 70 and 71 which are joined respectively to the gears 35 and 38 to maintain the adjacent brake drums in position, has a peripheral recess, as shown in Figures 6 and 8, the recess of collar 70 being indicated by the numeral 79 while the recess for the collar 71 is indicated by the numeral 80. Each of these recesses is designed to receive a trip leaf 81 which is secured to the adjacent locking lever pintle 56. These pintles 56 are carried through the adjacent brake drum wall 66 by way of a circumferentially directed slot 82 which permits of movement of the drum relatively to the pintle.

The bracket 3 which is secured to the supporting body 1 has a relatively long straight portion 83 which extends across and in spaced relation with the brake drums 64 parallel with the shaft 2. This straight portion 83 of the bracket carries two brake shoes each of which is indicated as a whole by the numeral 84 and each brake shoe comprises two semi-circular portions 85 one end of which is pivotally secured, as indicated at 86, to a side of the part 83 of bracket. The other end of each brake shoe portion terminates in an apertured ear 87 and the two ears are joined to facilitate actuation of the brake shoe by mechanism about to be described. The inner face of each portion of each brake shoe carries a liner 87' which is spaced from but adapted to be drawn into frictional contact with the circular wall 65 of the brake drum which the shoe encircles.

The bracket 4 which is disposed upon the opposite side of the mechanism from the bracket 3 also includes an elongated portion which is indicated generally by the numeral 88 and which parallels the shaft 2, extending across the brake drums, as shown in Figures 1 and 2, and at its forward end it has the inwardly turned terminal portion 89, the free end of which is in close proximity to the forward brake drum in the plane of the forward end wall 66.

Upon the inner side of the part 88 of the bracket 4, which is the side nearest the brake drums, are two pairs of spaced ears, one ear of each pair being indicated by the numeral 90 while the other ear of the pair is indicated by the numeral 91. These ears extend toward the adjacent drum with their flat surfaces in planes perpendicular to the rotary axes of the drums. Between the turned part 89 of the bracket 4 and the nearest pair of ears 90—91, the portion 88 is provided with a longitudinal slot 92 and a similar slot indicated by the numeral 93 is formed in the bracket between the two pairs of ears. Each of these slots is located between two inwardly extending bearing arms 94 each of which, as shown in Figure 16, has a bearing opening 95 and bearing channel or recess 96 in its outer face which extends from the opening 95 to an edge of the arm. Each pair of bearing arms 94 is disposed between a pair of terminal ears 87 for a brake shoe 84.

The ear 91 farthest removed from the inturned portion 89 of the bracket 4 is extended, as shown in Figure 2, toward the adjacent brake drum, beyond the ear 90 with which it cooperates and is suitably apertured to form a bearing which receives one end of a rock bar 97, the other end of which passes through and is rotatably supported in the portion 89 of the bracket 4. This rock bar carries the two levers 98 and 99 which are substantially in right angular relation so that the arm 98 extends in the plane of the collar 70 transversely to the axis of the shaft 2 and overlies the trip leaf lying in the recess 79 of this collar, while the other lever lies in the plane of the collar 71 along the periphery of the collar to overlie the recess 80 therein for the engagement of the adjacent trip leaf 81. This arrangement of the levers, recesses and trip leaves is clearly shown in the diagrammatic view forming Figure 6.

Secured to the rock bar 97 are two locking fingers 100 and 101 which have substantially semi-circular or crooked terminals 100' and 101'.

The locking fingers 100 and 101 are each located between a pair of spaced ears 90—91, as shown in Figure 2, and the crooks are oppositely directed, as shown in Figures 2 and 6, for the purpose hereinafter described.

Upon the rear end of the rock bar 97, rearwardly of the innermost one of the ears 91, the bar carries a rigid arm 102 which forms one unit of a snap joint, the function of which is to securely maintain the rock bar in one or the other of its two extreme positions. The other element of this snap coupling comprises the rod 103 which is pivotally attached at one end, as indicated at 104, to the adjacent bracket and has sliding movement through a pivoted pin 105 carried upon the free end of the arm 102. Between this pivoted pin 105 and the pivoted end of the rod 103 is a compression spring 106 which is compressed or put under tension when the arm 102 and rod 103 are oscillated into parallel relation and expands when such parallel relation is passed to throw the arm 102 to one side of the center line passing through the rod 97 and the pivot 104, as illustrated in Figure 8. By this means one of the levers 98—99 is constantly maintained in inwardly moved position against the adjacent recessed collar with which the trip leaf 81 is associated while the other lever is maintained in position away from its recessed collar, as illustrated in Figure 6.

The contraction of each of the brake shoes 84 is effected by the mechanism which is particularly illustrated in Figures 3 and 7. The control mechanism for each brake shoe is the same so the description of one will serve for both and the same reference characters will be employed upon these two units.

Each of the ears 87 of a brake shoe has an aperture 107 therethrough. Loosely fitted in each aperture 107 is a stem 108 which forms an integral axial extension of one end of a coarse threaded screw 109. Collars 110 at the ends of the stem 108 position upon opposite sides of the ear 87 and prevent undue axial movement of the screw. The pairs of screws 109 between each pair of ears 87 are in spaced axial alinement and the threads upon one are of opposite hand to the threads upon the other as is clearly shown in the figures referred to. Each of the screws has an axial bore or passage 111 of polygonal cross-section.

Operatively coupling together each adjacent pair of screws 109 is a yoke unit indicated generally by the numeral 112. This unit comprises the pair of nuts 113 which are rigidly coupled in spaced axial alinement by a web portion 114, the free longitudinal edge of which is tapered off to V shape as indicated at 115 in Figure 9.

The remote ends of the nuts 113 are open to receive the screws 109 while the opposite or adjacent ends are partly closed and provide the small central bearing openings 116, Figure 3. These openings 116 are of the same diameter as the openings 95 in the bearing arms 94 and each of the openings 116 is encircled by a bearing shoulder 117 which is adapted to position for rotative movement in the inner end of a slot 96 of a bearing arm 94. When the bearing shoulders 117 of a pair of nuts, are located in the slots 96 of a pair of bearing arms 94, as shown in Figures 3 and 7, the yoke is oscillatable upon the axis of the apertures 95 and 116 and the web 114 of the yoke is directed toward the nearest ear 90.

Extending through the apertures 95 of a pair of arms 94 and through the apertures 116 of the adjacent nut is a rock shaft 118 which at its central part is of circular cross-section to rotate in these apertures while end portions 119 are of polygonal cross-section to correspond to and fit in the bores 111 of the adjacent screws.

Mounted upon and secured to the rock shaft 118 between the pair of bearing ams 94 is an operating or control lever 120 which extends laterally through the opening 92 of the adjacent supporting bracket. As stated this lever is secured to the rock shaft and thus it will be seen that if the yoke is held against rotary movement when the lever is rocked to turn the rock shaft, the screws will be rotated and will be fed in or out with respect to the nuts so as to draw the two portions of the brake shoe together for gripping relation with the adjacent brake drum or spread such portions apart for the release of the drum. The mechanism for holding and releasing the yoke for these operations is hereinafter set forth.

Adjacent to and upon the forward side of each operating lever 120, as shown in Figure 2, is a laterally projecting ear 121 with which is connected one end of a contractile spring 122, the other end of which is attached to the adjacent lever. These springs constantly tend to pull the operating levers forwardly to inoperative position.

The inner end of each operating lever 120 has a short oblique extension 123, Figure 2, which is upon the side of the arm nearest to the adjacent ear 90 and this extension at its outer end has an aperture for the loose extension therethrough of a pin 124, the other end of which is pivotally attached to the nearest side of the adjacent yoke web 114. Surrounding this pin 124 and interposed between the extension 123 and the adjacent yoke web is an expansion spring 125 which constantly urges the yoke web and the adjacent extension 123 apart.

Operatively associated with the crooked end of each of the locking fingers 100-101 is a locking mechanism which is particularly illustrated in Figure 9. This locking mechanism comprises a locking pin 126 which is reciprocably disposed in an aperture 127 in the ear 91 which lies at the inner side of the locking finger. The locking pin includes a head portion 128 which is slidably disposed in an aperture 129 in the adjacent guide ear 90 and this head terminates in the conical point or tip 130 which projects forwardly, under normal conditions, beyond the guide ear 90 and has the tapered edge 115 of the adjacent yoke web 114 disposed against the outer side thereof, as is illustrated in Figure 2.

The enlarged head portion 128 of the lock pin forms a shoulder 131 which is exposed between the guide ears 90—91 and between which and the ear 91 the crooked portion of a locking finger engages, the crook of the finger receiving the smaller part of the lock pin.

In the end of the aperture 127 remote from the lock finger a removable guide nut 132 is secured, through which the end of the lock pin slidably extends and within the aperture 127 the pin carries a collar 133 and between this and the guide 132 is interposed a spring 134 which constantly urges the lock pin in a direction to project the tapered tip thereof beyond the forward face of the guide ear 90, as shown in Figure 9. The forward movement of the lock pin is controlled or limited by the stop pin 135 which is extended from one edge of and through the guide ear 91 into the aperture 127 to engage the collar 133, as shown.

As illustrated in Figure 2, the propeller shaft 2 has a reduced neck portion 7 at the tapered end of the fluted portion 5. Encircling this neck 7 is a split collar 135, a detail of which is shown in Figure 15. This collar, as shown in Figure 2, maintains the hub 12 against forward axial movement on the shaft 2.

As shown in Figure 1, the gears at the inner ends of the propellers and the propeller hub are enclosed in a housing which is indicated generally by the numeral 136 and this housing comprises two main portions 137 and 138 and the nose portion 139.

The portion 137 of the housing is suitably formed to receive the collar 135 and the tapered fluted part 6 of the propeller shaft, which fluted part is locked to the housing to prevent turning of the housing on the shaft and the housing is, of course, chambered to snugly receive the gears 24 and parts associated therewith so that such parts which are intended to rotate may do so freely. After the part 137 of the housing is placed in position over the hub 12 and is bolted to the inner part 138, the nose portion 139 which is chambered to receive the terminal parts 8, 9 and 11 of the shaft, as shown in Figure 2, and is also chambered to receive a locking collar 140, is placed in position and threadably coupled with the portion 137 by means of the exteriorly threaded extension 141 which is received in the portion 137 in the manner shown.

The collar 140 is of substantially the same design as the collar 135 and engages about the neck portion 8 between the terminal cylindrical portion 9 and the fluted portion 6 and the tip of the nose is provided with an axial passage 142 to receive the tap screw 11 which cooperates with the threaded portion 141 to maintain the tip or nose in place.

In the operation of the present mechanism when the propeller blades are set, as shown in Figure 1, for forward movement the lugs 28 forming a part of the gears 24 will be in position each against one side of a stop 19 which forms a fixed part of a hub arm 14. Both brakes will be free of connection with the brake drums and the operating levers 120 will be in the positions shown in Figure 2 with the web 114 of each yoke disposed at the outer side of the tip of the lock pin head 128. The locking lever 57 associated with the forward gear 35 will be in the gear locked position shown in Figure 3 so that the locking key 54 of this forward gear will function to operatively couple the gear with the sleeve 30. With the leg 60 of the forward locking lever 57 in the position shown in Figure 3 it will be seen that the trip leaf 81 which is connected with this forward locking lever will be raised out of the recess in the collar 70 to force the lever 99 to the position shown in Figure 6. The other lever 99 will be forced in against the collar 71 and consequently the pintle 56 for the rear locking lever will be oscillated so that this rear locking lever will be in the position shown in Figure 12, the locking key 54 being out of the adjacent recess 53 of the sleeve and bearing against the surface of the sleeve and consequently the rear gear will have some freedom of movement as will be hereinafter described until the locking key is forced back into a position where it may enter the recess 53. The forward gear consequently is locked with respect to the sleeve 30 while the rear gear is unlocked or free. Also it will be apparent that since the rock bar is in a position to place the locking finger with its crooked end 100' in operative coupling with the lock pin adjacent thereto, the locking finger 101 will be swung away from the lock pin adjacent thereto so that the crooked end 101' of the finger 101 will be out of connection with the adjacent lock pin.

With the parts in the positions above stated, it will be apparent that the lock pin 126 which is engaged and held by the locking finger 100, cannot be shifted due to the fact that the shoulder portion 131 of this pin is engaged against the crooked finger 101' and thus the pin cannot shift back away from the adjacent yoke web. The other locking finger 101 is free of connection with the adjacent lock pin and, therefore, this lock pin is free to shift. Consequently a pull upon the operating lever 120 which is nearest the locking finger 101 or, in other words, a pull upon the rear operating lever will cause the associate yoke nuts and screws to turn together and the web of these nuts can slip back and forth across the pointed end of the adjacent lock pin. If, however, the operating lever 120 which is at the forward part of the mechanism and is associated with the locking finger 100, is pulled back the yoke 112 cannot swing because of the engagement of its web against the point of the secured or held lock pin adjacent thereto. Consequently, the nuts of the yoke will be held stationary but the associated screws will be rotated and will thus be fed into the nuts, sliding upon the squared portions 119 of the rock shafts 118. This will bring the forward brake shoe into gripping relation with the drum which, like the other drum and the two main gears, may be rotating with the shaft 2, although the forward gear 35 is the only one which is positively locked with the shaft through the medium of the sleeve 30 and, therefore, it is positively driven.

When either gear is locked, the spring 76 associated therewith will be expanded, but not to its fullest extent, as illustrated in Figures 3 and 4, while the corresponding spring associated with the unlocked gear will be compressed.

When the brake band of the locked gear, in this case the forward gear, is contracted to grip and stop the rotation of the drum which it encircles this will bring about a relative rotary movement between the gripped drum and the locked gear so that the drum in effect moves reversely to the gear. If reference is had to Figure 3 of the drawings, it will be readily apparent that if the parts are all moving in a clock-wise direction prior to the engagement of the drum by the adjacent brake band, when such engagement is effected the drum will in effect move counter-clockwise. This will place the spring 76 under immediate tension or compression and since the locking lever 57 is supported upon the gear it will be shifted so that one of its arms will disengage the cam 78 while the other one will ride on the cam 77, thereby swinging the leg 60 from over the locking key 54.

As soon as the cam 77 of the shifting drum has effected oscillation of the locking lever 57 to release the key 54, the compressed spring 76 will turn the front gear counter-clockwise, the gear now being released from connection with the sleeve 30, the key being pushed radially outwardly from the recess 53 of the sleeve and this action turns the entire train of gears.

While the rear gear is unlocked from the sleeve 30, it and the adjacent drum are held against relative turning movement and the spring 76 associated with the rear gear and drum is under compression. This spring is constantly urging the drum to turn on the gear, but this is not possible due to the fact that, as shown in Figure 12, the portion 60 of the locking lever 57 is held against swinging movement due to its contact against the locking key 54 which projects from the recess or passage 52 partly into the arcuate recess 51 in which the leg of the locking lever must move.

When the previously described turning movement of the front gear 35 takes place this will effect a turning of the rear gear and its drum, around the sleeve 30 in a direction to move the locking key 54 to a position where it will drop into the recess 53 of the sleeve. As soon as this occurs the key 54 will be out of the way of the leg 60 of the locking lever and will no longer hold this lever against oscillation. Consequently, the compressed spring between the rear gear and its adjacent drum will then be free to effect relative rotary movement between the rear gear and its drum, thereby causing oscillation of the locking lever so as to move the leg thereof into position across the key slot 52. Thus the gears will be shifted so that the locking key of the previously locked front gear will be out of its slot 52 and the front gear and drum will be locked together against relative turning movement with the spring 76 therebetween under compression and the rear gear will be coupled by the rear locking key 54 with the sleeve 30 and the spring 76 between the rear gear and rear drum will be practically fully expanded as the spring associated with the front gear and drum is shown in Figure 3. The relative turning of the gears will, of course, oscillate the gears 24 so as to turn the propeller blades to the reverse position from that which they previously occupied.

It is believed that it will be readily apparent that when the rear drum is gripped after shifting of the gears in the manner stated, the same operation will take place in reverse so as to unlock the rear gear from the sleeve 30 and the propeller shaft and again lock the forward gear to these units.

At the time that the initial relative movement between the forward gear and the forward drum takes place, and the forward lever 57 is oscillated as stated, the trip leaf 81 associated with the forward gear and locking lever will be swung into the recess 79 of the adjacent collar 70 away from the lever 98. This leaves the lever 98 free to swing inwardly but this action does not occur until the oscillation of the rear locking lever is effected by the cams of the rear drum. When the rear locking lever is thus oscillated, the trip leaf which is operatively coupled with the pintle of this lever will be swung outwardly against the lever 99 forcing this lever to swing outwardly and effecting the turning of the rock shaft 97. When the rock shaft is turned under the action of the rear trip leaf 81, the arms 100 and 101 will be oscillated so as to move the crooked terminal portion 100' of the arm 100 away from the forward locking pin 126 and moving the crooked end 101' of the arm 101 into position behind the shoulder 131 of the rear locking pin 126. When the forward lever 120 was pulled for the purpose of contracting the forward brake band against the forward drum the web of the forward yoke was held against movement across the point of the secured locking pin 126 and, consequently, the screws were turned and threaded into the sleeve 113 to contract the brake shoes. As soon, however, as the stated shifting of the arms 100 and 101 occurs the forward locking pin 126 will no longer be held against movement and since the spring 125 which is associated with the forward lever 120 was under tension it will be seen that it will kick the web 114 of the adjacent yoke across the released locking pin 126, and consequently turning the sleeve 113 in a direction to cause the screws to move outwardly and to release the adjacent drum from the grip of the encircling brake shoes.

The rear locking finger will now be secured against movement so that the web of the yoke which is associated with the rear operating lever 120 will be held against movement and any rearward pull upon the rear operating lever will cause the screws of the adjacent yoke to move in and the brake band to be contracted around the adjacent drum.

Thus, the propellers will be shifted to reverse position while continuing to rotate in the same direction as formerly and they will function to force the mechanism back or act as a brake to the structure upon which the mechanism is operated. It will be readily apparent that with the parts in the position stated the return of the propeller blades to forward pitch position is effected by pulling the rearmost operating lever 120 rearwardly so as to bring about a reversal of the operation previously stated.

Since in the carrying out of the operations described there is relative movement between the gears 35 and 38, the intermediate idling gears 44 will be suddenly turned and due to the fact that the chamber of each gear is filled with a fluid and movement of the gear turns the dasher element 49 through the chamber relative to the baffle 43 the fluid will absorb the shock incident to the sudden movement of the parts.

I claim:

1. A reversible pitch propeller structure, comprising a propeller shaft, a pair of propeller blades operatively coupled with said shaft to be rotated by the shaft about the axis thereof, said blades being supported for turning about their longitudinal axes, means limiting the turning of the blades to forward and reverse pitch positions, a pair of units rotatably supported upon the shaft and operatively coupled together to transmit turning movement from one unit to the other unit and in the opposite direction, one of said units being operatively coupled with the propellers to turn the latter when the unit connected therewith is turned about the shaft, means by which said units may be selectively operatively coupled with the supporting shaft, and selective mechanism for effecting the disconnection of one unit from the shaft and immediately thereafter establishing connection of the other unit with the shaft and also effecting relative movement between the units for imparting rotary motion to the propeller blades.

2. A reversible pitch propeller structure, comprising a propeller shaft, a hub secured to said shaft and having oppositely directed radial axles, a propeller blade supported upon and extending longitudinally of each axle for turning movement thereon, means limiting the turning movement of each blade upon the supporting axle whereby each blade may be turned from a forward pitch to a reverse pitch position, a pair of gears supported upon the shaft for turning movement, an idler gear coupling between the pair of gears, a gear connection between one gear and the pair of propeller blades, mechanism carried by each of the pair of gears for operatively coupling the gear with the shaft, a selectively controlled means by which one of the pair of gears may be disconnected from the shaft and the other gear immediately subsequently coupled with the shaft, and means operating after the operation of said selectively controlled means to effect rotary turning movement relatively between the pair of gears and the turning of the blades upon their axles.

3. A reversible pitch propeller structure, comprising a propeller shaft, a hub secured to said shaft and having a pair of oppositely directed radial axles, a propeller blade mounted upon and extending longitudinally of each axle for turning movement thereon, means limiting the turning of each propeller blade between a forward pitch and a reverse pitch position, a gear operatively coupled with the inner end of each blade, a pair of gears mounted upon the shaft for turning movement thereon, one gear of said pair being coupled with the gears of said blades, an idler gear coupling supported on the shaft and interposed between the pair of gears, means for locking either gear of said pair against turning movement relative to the shaft, one gear locking means being operative at all times that the propellers are in effective pitch position while the other gear locking means is inoperative, selective mechanism for effecting the release of the locked gear and the immediate subsequent securing of the unlocked gear while the structure is rotating, and means operating after the operation of said selective mechanism to effect relative turning movement between the pair of gears and the transmission of turning movement to the blades.

4. A reversible pitch propeller structure, comprising a propeller shaft, a pair of propeller blades supported upon and extending in opposite directions radially from said shaft, a gear connected with the inner end of each blade, each of said blades being turnable on its longitudinal axis, means limiting the turning movement of each blade between a forward pitch and a reverse pitch position, a pair of axially spaced gears mounted for turning movement on said shaft, a pair of oppositely directed radially extending trunnions coupled with the shaft between the pair of gears, idler gears mounted upon said trunnions and operatively coupling the pair of gears, a releasable locking means between each of the pair of gears and the shaft, one of said pair of gears being locked to the shaft when the propellers are in effective pitch position while the other one is unlocked therefrom, mechanism for effecting the unlocking of the locked gear and the immediate subsequent locking of the unlocked gear during the turning of the shaft, and means operating after the operation of said mechanism to effect relative turning movement between the pair of gears and the turning of said blades.

5. A reversible pitch propeller structure, comprising a propeller shaft, a pair of oppositely directed radial propeller blades connected with said shaft and supported for turning about their longitudinal axes, a gear connected with the inner end of each blade, a pair of gears supported on the shaft for turning movement relative thereto, one of the pair of gears being operatively coupled with the gears of the blades, idler gears interposed between and coupling the pair of gears, a locking key carried by each gear of said pair and having limited radial movement for locking and unlocking the adjacent gear with respect to the shaft, a shiftable latching means carried by each of the pair of gears for selectively holding and releasing the adjacent latching key, the locking key of one gear being held in locking position by the adjacent latching means at all times that the propellers are in effective pitch position while the other locking key is in unlocking position, means for effecting the release of the held locking key through the actuation of the adjacent latching means and the immediate subsequent engagement of the released locking key and holding thereof by the adjacent latching means, and means operating after the operation of said means for effecting the release of the held locking key for effecting relative turning movement between the pair of gears and the transmission of turning movement to said blade.

6. A reversible pitch propeller structure, comprising a shaft, a pair of propeller blades mounted upon the shaft to extend radially in opposite directions therefrom, said blades being rotatable on their longitudinal axes, a gear upon the inner end of each blade, a pair of gears supported upon the shaft for turning movement relative thereto, one of the pair of gears being operatively coupled with the gears of said blades, idler gears interposed between and coupling the pair of gears, a locking key carried by each of the pair of gears and having limited radial movement for locking and unlocking the adjacent gear relative to the shaft, an oscillatable latch carried by each of the pair of gears and having one position in which the adjacent locking key is held in gear locking position, one of said gears being locked against movement relative to the shaft when the propellers are in effective pitch position while the other gear is unlocked, a drum encircling each gear of the pair, spring means between each drum and the adjacent gear and urging relative movement between the gear and drum, coacting means between each drum and the adjacent latch by which relative movement of the drum and gear in one direction effects movement of the latch to key locking position and such relative movement in the opposite direction effects movement of the latch to key releasing position, said spring means normally urging relative movement between each drum and the adjacent gear in a direction to effect movement of the latch to key locking position, and means for effecting relative movement between the locked gear and the adjacent drum for the release of the key of the locked gear whereby the spring of the unlocked gear becomes effective to move the unlocked gear into locked position and produce relative turning movement between the pair of gears to effect rotation of said blades.

7. A reversible pitch propeller, comprising a propeller shaft, a pair of propeller blades coupled to the shaft to rotate therewith and each supported for limited turning on its long axis, a bevel gear carried upon the inner end of each blade, a double bevel gear encircling the shaft adjacent to and in toothed connection at one side with the propeller gears, a single bevel gear encircling the shaft, idler gears carried by the shaft and interposed between and coupling together the shaft carried gears, a locking key carried by each shaft gear and having radial movement for selectively locking the shaft gears to the shaft, a locking lever pivotally supported on the shaft gear and movable to secure the adjacent key in its locking and its unlocking position, a brake drum encircling each shaft gear and having turning movement thereabout and housing the locking lever carried thereby, means for establishing an operative coupling between each drum and the adjacent locking lever upon partial turning of the drum in either direction relative to the adjacent gear, to shift the lever to one of the locking key securing positions, spring means forming a coupling between each drum and the adjacent gear and constantly urging the said partial turning of the drum in a direction to move the locking lever to the position of securing the adjacent key in the position in which the adjacent gear is unlocked from the shaft, one of said shaft gears being unlocked from the shaft and the other shaft gear is locked to the shaft at all times that the propellers are in effective pitch position, and means for gripping the drum encircling that gear which is keyed to the shaft to effect the stated partial turning of the drum relative to the shaft whereby relative turning of the shaft gears will be effected for producing turning of the propellers to a different pitch position.

8. A reversible pitch propeller structure as set forth in claim 7, in which the stated means for establishing an operative coupling between each drum and the adjacent locking lever, comprises a pair of oppositely directed fingers carried by the locking lever and two spaced camming members carried upon the interior of the drum and disposed upon opposite sides of the locking lever and directed circumferentially of the drum, one of said camming members functioning upon a relative turning of the drum and the adjacent shaft gear to engage a lever finger to effect oscillation of the lever.

9. A reversible pitch propeller of the character set forth in claim 7, with mechanism connected with each drum gripping means for controlling the actuation of the drum gripping means, and actuating connections between said locking levers and the control mechanism by which the control mechanism for the gripping means of the drum of that gear locked to the shaft will be set to permit actuation of such gripping means and the control mechanism for the other gripping means will be set to prevent actuation of the said other gripping means.

OTTO ERNEST DIETRICH.